United States Patent
Diederich

(12) 
(10) Patent No.: US 6,642,713 B2
(45) Date of Patent: Nov. 4, 2003

(54) ABSOLUTE TRACK WIDTH MEASUREMENT ON MAGNETIC RECORDING HEADS

(75) Inventor: Michael Diederich, Mainz (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/105,651

(22) Filed: Mar. 25, 2002

(65) Prior Publication Data

US 2002/0140421 A1 Oct. 3, 2002

(30) Foreign Application Priority Data

Mar. 28, 2001 (EP) .............................................. 01107649

(51) Int. Cl.[7] .............................................. G01R 33/12
(52) U.S. Cl. ...................................... 324/210; 324/212
(58) Field of Search ................................. 324/210–212, 324/252; 360/25, 31, 39, 75, 77.06, 314, 324, 324.1

(56) References Cited

U.S. PATENT DOCUMENTS

| | | | | |
|---|---|---|---|---|
| 4,276,324 A | * | 6/1981 | Pohler et al. | .................. 427/10 |
| 5,850,326 A | * | 12/1998 | Takano et al. | .............. 360/122 |
| 6,260,257 B1 | * | 7/2001 | Emo et al. | ................ 29/603.09 |
| 6,265,868 B1 | * | 7/2001 | Richter | ........................ 324/212 |
| 2002/0064006 A1 | * | 5/2002 | Hasegawa | .............. 360/324.12 |

* cited by examiner

*Primary Examiner*—Jay Patidar
(74) *Attorney, Agent, or Firm*—Ronald Feece; Bracewell & Patterson, L.L.P.

(57) ABSTRACT

A method for magnetically measuring the magnetic read width (MRW) of magnetic recording heads having a track width that is equal or smaller than the wavelength of visible light is provided. The heads comprise a magnetic read head spin valve sensor and the magnetic read head sensor signal is used to derive an unknown track width from comparing to the sensor response of a known track width. Using this method, track widths in the regions at the wavelength of light and below (<500 nm) can be directly measured without destroying the respective sensor material.

8 Claims, 3 Drawing Sheets

ABSOLUTE TRACK WIDTH MEASUREMENT ON MAGNETIC RECORDING HEADS

This application claims the priority benefit of European Patent Application No. 01107649.4, filed on Mar. 28, 2001, and entitled "Absolute Trackwidth Measurement on Magnetic Recording Heads."

1. Field of the Invention

The present invention relates in general to magnetic recording heads. More specifically it relates to the measurement of the track width of such heads.

2. Background of the Invention

In a magnetic disk drive, data is written and read by magnetic transducers called "heads" which are positioned over a disk while it is rotated at a high speed. Magnetic heads are mounted on sliders that are supported over a surface of the disk by a thin cushion of air (an "air bearing") produced by the disk's high rotational speed. In order to increase the amount of data stored per unit of disk surface area ("areal density"), more data must be written in narrower tracks on the disk surface.

Read/write heads are manufactured by a costly and complicated process. First, the read/write elements are applied to a wafer. This is normally done by thin film technology, thereby applying very thin layers by sputtering and electroplating. These layers are subsequently given their coherent shape by etching techniques. The wafer thus treated is then sawed up in order to be treated further mechanically.

One principal means of improving areal density of magnetic recording is to improve the number of data tracks which a write head can record on a disk; the related parametric expression is "tracks per inch" or "TPI". The TPI capability of a write head is increased by decreasing the head dimension which determines the width of a data track; typically this dimension is called the head "track width".

The above mentioned wafer process is traditionally controlled with optical width, which defines the junction between the sensor and the hard bias/leads material. However, this junction is not defined sharply.

The track width of the read head is determined by the width of the GMR (Giant Magneto Resistive) sensor material at the air bearing surface (ABS). Since the dimensions of magnetic heads are decreasing rapidly, the track width now enters regions at the wavelength of light, i.e., <500 nm. Thus, useful optical measurements will become extremely difficult and SEM measurements are complicated to carry out since there is no material contrast between the active sensor area and the adjacent lead structure. This is due to the fact that both the sensor and the lead area may be provided with tantalum layers as protective caps during manufacture of the heads.

FIG. 1 shows the definition of the magnetic read width (marked by the two arrows) which has been measured using a SEM with high sensitivity/low current. The K5-Final is measured using traditional optical microscopes, whereby a measurement sensitivity below 600 nm only allows degraded tracking of process variations. In addition, process control based on photo measurement assumes stable milling and deposition processes.

When using SEM methods, what is measured is not the track width directly, but the photo resist being present above the structure before the etching process.

In addition, using high current SEM in order to penetrate the tantalum protective layer, will destroy the respective material.

Thus, a need exists for a method to adequately directly measure the absolute track width on narrow track magnetic recording heads.

SUMMARY OF THE INVENTION

It is therefore an object of the present invention to provide a method that allows measuring the absolute track widths being in the area of the wavelength of light.

It is a further object of the invention to provide such a method that allows a respective measurement without destroying the respective material.

These and other objects and advantages are achieved by the method disclosed in the claims.

Advantageous embodiments of the invention are described in the dependent claims.

BRIEF DESCRIPTION OF THE DRAWINGS

The invention will in the following be described in more detail in conjunction with the accompanying drawings in which.

DETAILED DESCRIPTION OF THE PREFERRED EMBODIMENT

The present invention uses the magnetic read head sensor signal to derive an unknown narrow track width from comparing to the sensor response of a known large track width. In this connection, narrow means $\leq \lambda$, where $\lambda$ is the wavelength of the visible light (about 500 nm), and large means $>> \lambda$.

Thus, the magnetic read width (MRW) is measured using the resistance change Delta-R of the sensor due to magnetic field change. In general, a large Delta-R is necessary to perform the method of the present invention, thus modem sensors like spin valve sensors (GMR technique) are needed.

The resistance change Delta-R of the sensor is defined by the following equation $$Delta\text{-}R = Sheetrho * GMRCoef * MRW/height \tag{1}$$

wherein Delta-R is the resistance change of the sensor, Sheetrho represents the sheet resistance of a respective stripe of sensor material, a stripe being a general, rectangular structure; GMRCoef represents the relative resistance change allowed by the sensor (GMRCoef thus being a material constant of the sensor layer), MRW is the width and the height of the respective stripe.

The problem with this equation is that reference devices are needed for the parameters Sheetrho, GMRCoef and height.

Figure 1:
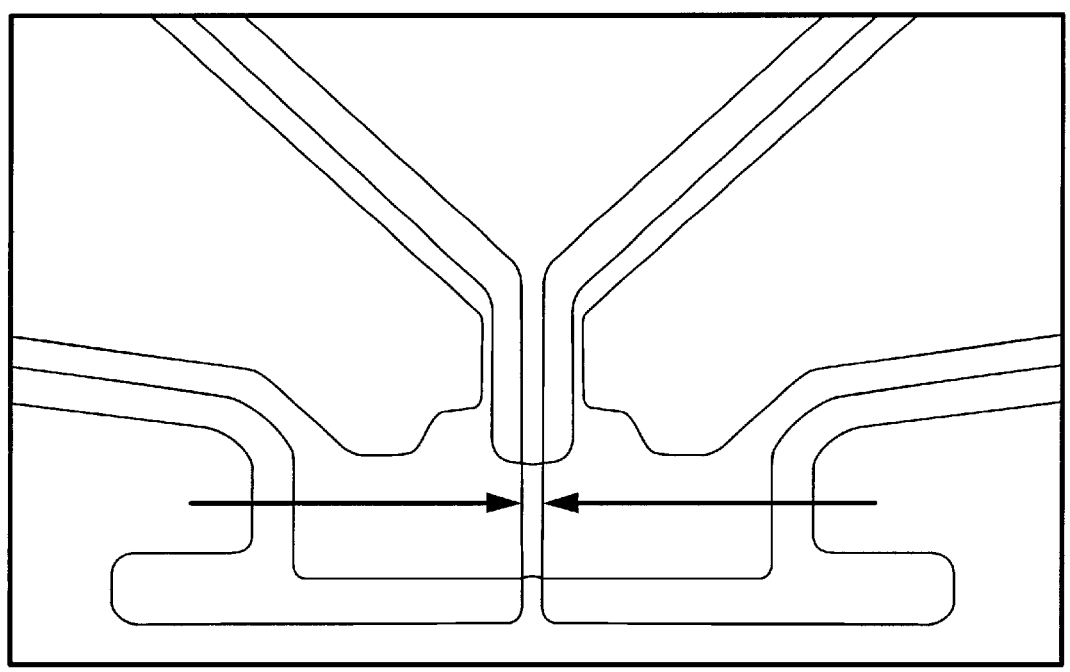
FIG. 1 shows the definition of the magnetic read width (marked by the two arrows) which has been measured using a SEM with high sensitivity/low current.
Figure 2A:
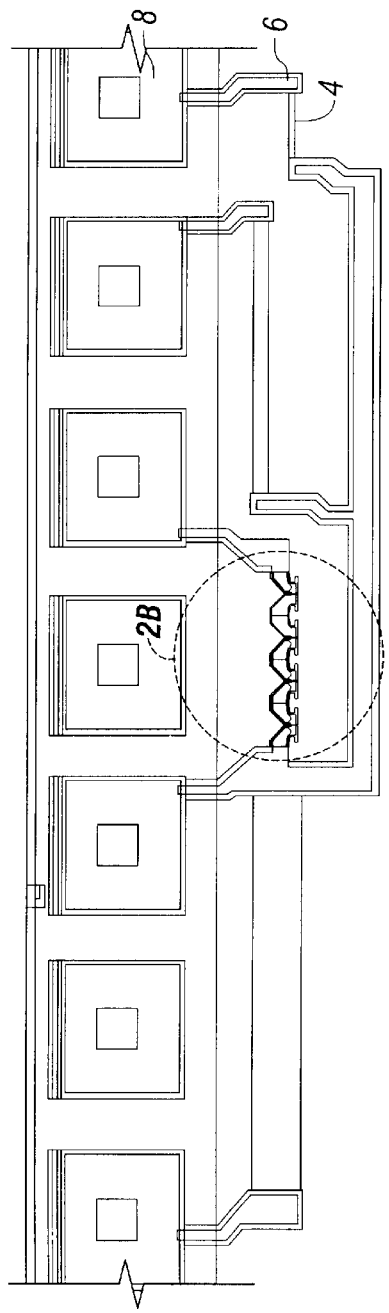
FIG. 2 schematically depicts the test chips on a wafer that are used as a reference for the method according to the invention.
Figure 2B:
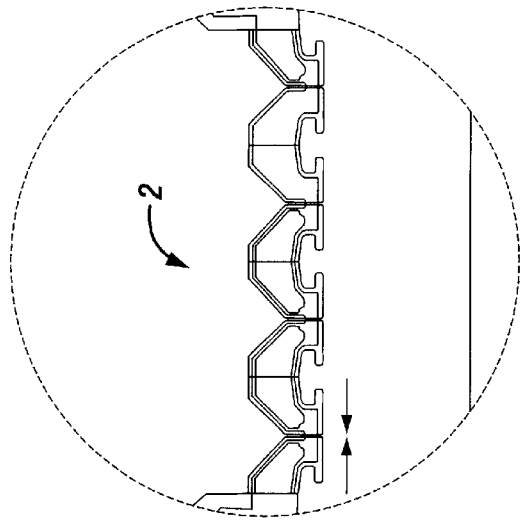

It has already been mentioned that during manufacture of the heads, the read elements are applied to a wafer. It is, however, common to add special test structures to the wafer for mask alignment and all kinds of traditional production tests. These structures existing on the wafer (also referred to as "Test-Chips") are used by a special tool to carry out magnetic resistance (MR) stripe characterization tests. FIG. 2 schematically depicts the test chips 2 on a wafer that are used as a reference for the method according to the invention. A first stripe 4 is used as a reference and a second stripe 2 is represented by a pseudo head structure comprising four head-alike structures having a head-like MRW, the test chips. The stripes are connected via test chip-leads 6 to contact pads 8.

The present invention makes use of the same tool which is able to apply a magnetic field during these resistance measurements.

A stripe of sensor material will have a resistance of $$\text{Sheetrho} * \text{length/height} \quad (2)$$

In case a magnetic field is swept along the pinning axis of the spin valve sensor, the pinning axis being defined as the axis along which the sensor switches from a small resistance to a large resistance, a resistance change can be observed which is, in case of a read head, used as a read signal. The resistance of a sensor stripe has two contribution factors, namely:

a) A fixed resistance from the leads structure, probes and contact; and b) A variable resistance from the sensor as a function of the applied magnetic field.

Observing the resistance change only during field sweep cancels out leads, probes and contact effects and thus allows separate measurement of the variable resistance from the sensor. Thus, the resistance change is only dependent on the respective sensor stripe.

As the relative resistance change is a property of the used sensor film, the absolute resistance change is proportional to the absolute resistance of the stripe, assumed that a stripe resistance is always taken in the same spin valve state (either On or Off). The absolute resistance therefore is proportional to the length of the stripe.

Two stripes, being defined in the same process and being arranged close to each other, will have the same intrinsic properties and the same height. It is assumed that the length of the first stripe can be very well defined using today's photolithographical methods, i.e., the stripe has a known track width (e.g., L=50 $\mu$m). This is the case with the test structures on the wafer as described above. Now the maximum delta in resistance DR1 on this stripe is measured by sweeping the magnetic field in the axis of the spin valve pinning.

It is further assumed that the second stripe is very narrow, i.e., has an unknown track width that cannot be very well defined by known optical or SEM methods (e.g., L=0.5 $\mu$m) and consists of one (N=1) or multiple (N) identical segments, where every segment is built up identically to the real read heads, i.e., active stripe and adjacent leads structure (pseudo heads). Now the maximum delta in resistance DR2 on this stripe is measured by sweeping the magnetic field in the axis of the spin valve pinning, as is done for the stripe having the known track width.

The unknown length of the second stripe can then be derived from these values by the following equation:

$$MRW=(DR1/N)*(L/DR2) \quad (3)$$

where MRW is the unknown magnetic readwidth, DR1 is the maximum delta in resistance of the first stripe, DR2 is the maximum delta in resistance of the second stripe, N is the number of identical segments of the first stripe, and L is the known length of the second stripe.

Feasibility of this method can be proven by comparing SEM measurements before shaping the sensor stripe, where SEM measures the material contrast of photo-resist versus no photo-resist.

Figure 3A:
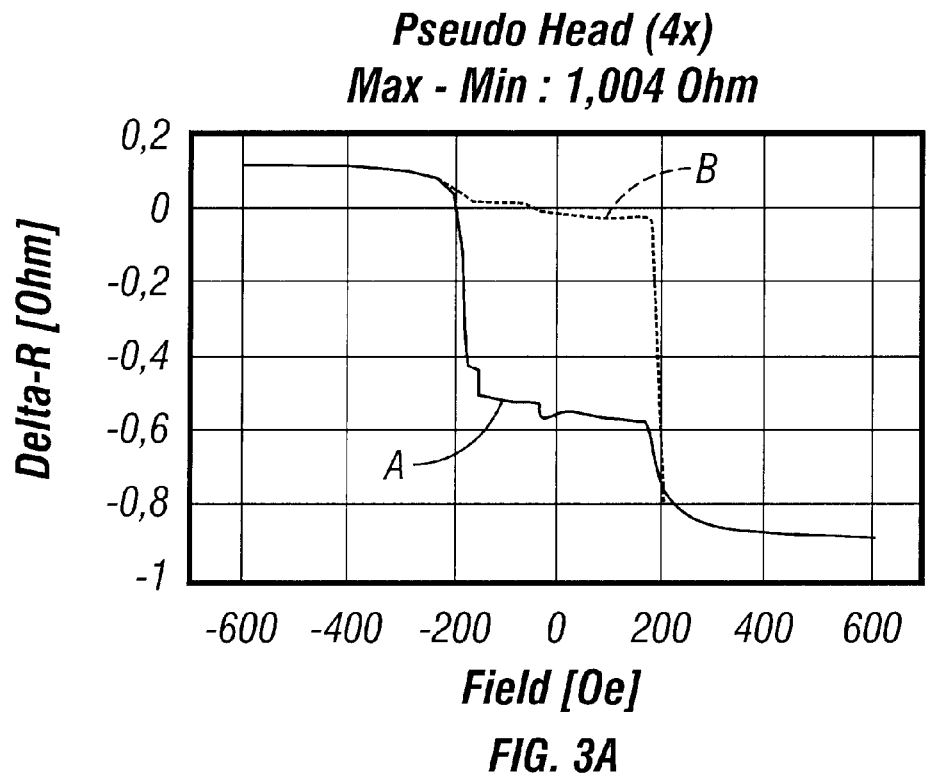
FIGS. 3A and 3B are graphs showing the resistance changes depending on the magnetic field applied for the test structures and a reference device, respectively.
Figure 3B:
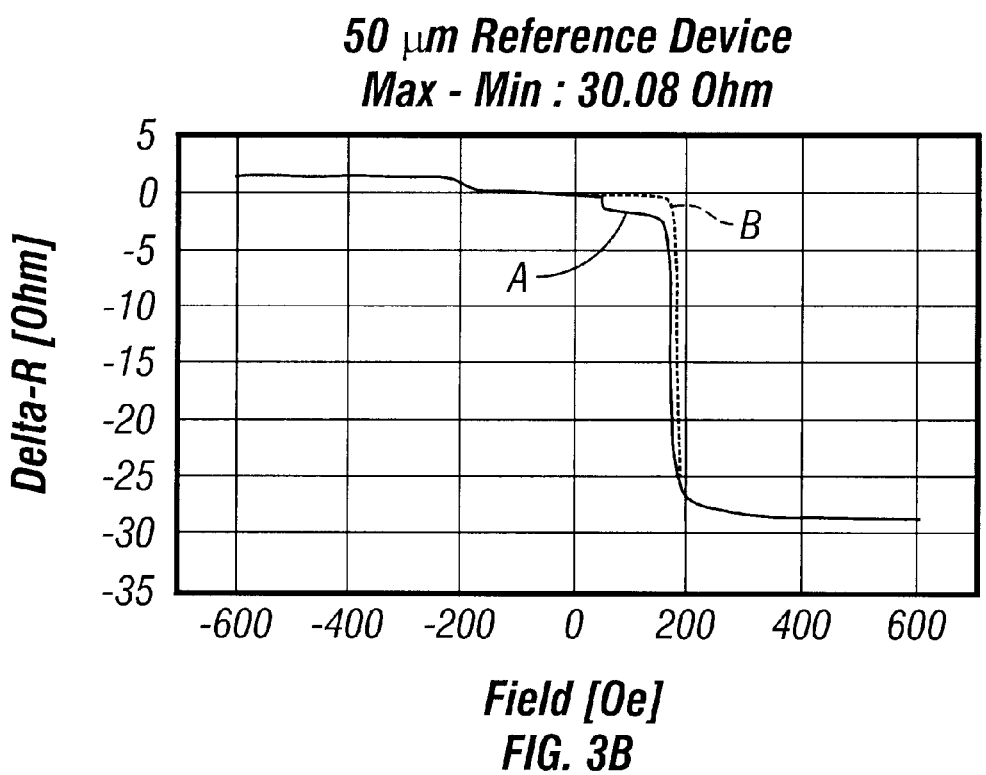

FIG. 3 are graphs showing the resistance changes depending on the magnetic field applied for the structures to be measured (stripe 2, pseudo heads of FIG. 2) and a reference device (stripe 1), respectively. Curve A refers to a rising magnetic field, curve B refers to a falling magnetic field. The unknown magnetic read width is calculated according to the above equation (3) using the measured values.

The method to magnetically measure the MRW according to the present invention has the advantage that no additional tools have to be used, since test-chip measurements are state of the art.

A further advantage resides in the fact that the accuracy of this method is scalable, i.e., increasing the number of segments (test chips) scales the accuracy directly. A progress in sensor development, i.e., higher response to the field, improves the measurement as track widths get smaller. It is also possible to reduce the size of the reference device, e.g., from 50 down to 10 $\mu$m to reduce noise.

The magnetic approach according to the invention is even more adequate as geometric measurements as it is intended to predict product performance as magnetic read head.

I claim:

1. An apparatus for magnetically measuring a magnetic read width of magnetic recording heads having a track width that is equal to or smaller than a wavelength of visible light, the heads having a magnetic read head spin valve sensor, the apparatus comprising:

means for measuring a resistance change of a sensor film for a known track width by sweeping a magnetic field in an axis of a spin valve pinning;

means for measuring the resistance change of the sensor film for an unknown track width by sweeping a magnetic field in the axis of the spin valve pinning; and means for calculating the unknown track width by comparing the resistance changes.

2. The apparatus of claim 1, wherein the unknown track width is less than 500 nm.

3. The apparatus of claim 1, wherein test structures on a wafer are used as reference devices.

4. The apparatus of claim 3, wherein the test structures comprise pseudo heads.

5. The apparatus of claim 4, wherein a number of pseudo heads is four.

6. The apparatus of claim 1, wherein the known track width is 50 $\mu$m.

7. A method of magnetically measuring the magnetic read width of magnetic recording heads having a track width that is equal to or smaller than a wavelength of visible light, the heads comprising a magnetic read head spin valve sensor, the method comprising the steps of:

a) measuring a resistance change of a sensor film for a known track width by sweeping a magnetic field in an axis of the spin valve pinning;

b) measuring the resistance change of the sensor film for an unknown track width by sweeping a magnetic field in the axis of the spin valve pinning; and c) calculating the unknown track width by comparing the resistance changes.

8. A computer program product stored on a computer usable medium having computer readable program code means, the program comprising:

means for measuring a resistance change of a sensor film for a known track width by sweeping a magnetic field in an axis of the spin valve pinning;

means for measuring the resistance change of the sensor film for an unknown track width by sweeping a magnetic field in the axis of the spin valve pinning; and means for calculating the unknown track width by comparing the resistance changes.

* * * * *